United States Patent
Hasegawa (10) Patent No.: US 11,388,305 B2
(45) Date of Patent: Jul. 12, 2022

(54) IMAGE READING APPARATUS AND IMAGE FORMING APPARATUS

(71) Applicant: CANON KABUSHIKI KAISHA, Tokyo (JP)

(72) Inventor: Bungo Hasegawa, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/325,856

(22) Filed: May 20, 2021

(65) Prior Publication Data
US 2021/0377415 A1 Dec. 2, 2021

(30) Foreign Application Priority Data
May 29, 2020 (JP) .............................. JP2020-095015

(51) Int. Cl.
*H04N 1/04* (2006.01)
*H04N 1/053* (2006.01)
*H04N 1/00* (2006.01)
*H04N 1/028* (2006.01)
*H04N 1/12* (2006.01)

(52) U.S. Cl.
CPC ......... *H04N 1/053* (2013.01); *H04N 1/00559* (2013.01); *H04N 1/00795* (2013.01); *H04N 1/00976* (2013.01); *H04N 1/028* (2013.01); *H04N 1/121* (2013.01)

(58) Field of Classification Search
CPC ............. H04N 1/053; H04N 1/005559; H04N 1/00795; H04N 1/00976; H04N 1/028; H04N 1/121
See application file for complete search history.

(56) References Cited

U.S. PATENT DOCUMENTS

| 9,834,399 B1* | 12/2017 | Hashimoto | ............ B65H 9/002 |
| 2015/0264207 A1* | 9/2015 | Kitaichi | ............ H04N 1/00798 358/434 |
| 2018/0273319 A1* | 9/2018 | Hasegawa | ............ B65H 9/002 |

FOREIGN PATENT DOCUMENTS

JP 2017-208745 A 11/2017

* cited by examiner

*Primary Examiner* — Cheukfan Lee
(74) *Attorney, Agent, or Firm* — Canon U.S.A., Inc. I.P. Division (57) ABSTRACT

An image reading apparatus includes a document placement unit, a document conveyance unit, a reading unit, a case, and a movable member. The document conveyance unit conveys a document, placed on the document placement unit, along a conveyance path. The case accommodates the reading unit and includes a transparent member which allows passing of light to receiving elements, and an opening. The movable member includes a cover portion and a connection portion and moves in an adjustment direction perpendicular to a longitudinal direction of the case. The cover portion covers the case opening while being in contact with an outside of the case. The connection portion connects the reading unit and the cover portion. When the movable member moves in the adjustment direction, the reading unit moves within the case to change an angle of the reading unit with respect to a document conveyance direction.

18 Claims, 10 Drawing Sheets

IMAGE READING APPARATUS AND IMAGE FORMING APPARATUS

BACKGROUND

Field

The present disclosure relates to an image reading apparatus and an image forming apparatus including the image reading apparatus.

Description of the Related Art

Conventionally, there is known an image forming apparatus, such as a copying machine or a facsimile, which includes an image reading apparatus for optically reading an image on a document. This type of image reading apparatus includes an auto document feeder (hereinafter referred to as an ADF) for feeding document sheets one by one, and a scanner for reading an image on the fed document sheet.

In such an image reading apparatus, a reading unit reads image information on a document via a transparent member such as a platen glass. In a case where a foreign substance enters between the reading unit and the transparent member, a streak-like image noise (image streak) may occur in the read image information.

In addition, in order to read the image information on the document with high accuracy, it is desirable that the document is conveyed in a state where the leading edge of the document is in parallel with the reading line of the reading unit. However, there is a case where a misalignment occurs between the leading edge of the document and the reading line of the reading unit due to component tolerance or other factors. In such a case, it is necessary to adjust the position of the reading unit.

Figure 10:
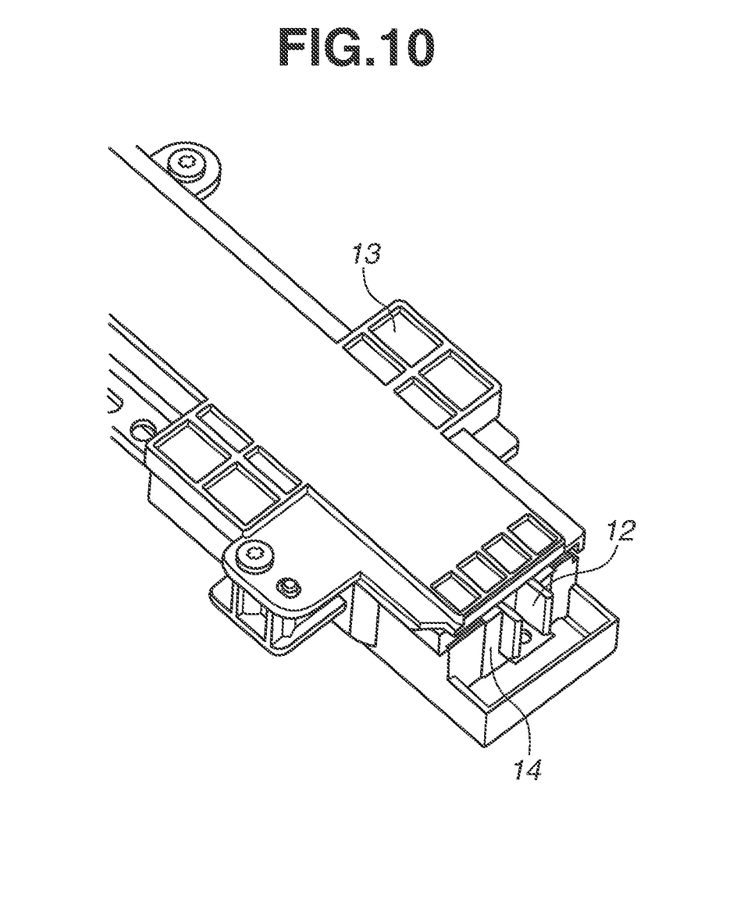
FIG. 10 is a perspective view illustrating a conventional reading unit.

Japanese Patent Application Laid-Open No. 2017-208745 discusses an image reading apparatus that can easily adjust the position of a reading unit while preventing a foreign substance from entering between the reading unit and a transparent member. As illustrated in FIG. 10, the image reading apparatus discussed in Japanese Patent Application Laid-Open No. 2017-208745 has a configuration in which the reading unit has a protruding portion 12 that protrudes outward from the opening of a sealing portion (or a case) 13 and a gap between the opening and the protruding portion 12 is filled with an elastic member 14 that can deform allowing the protruding portion 12 to move.

With the conventional configuration, the elastic member 14 such as a sponge is disposed to fill the gap between the opening of the sealing portion 13 and the protruding portion 12 in order to maintain the sealed state. Thus, due to an assembly mistake or aging, there may be a case where the sealed state is not maintained sufficiently and a foreign substance enters between the reading unit and the transparent member.

SUMMARY

The present disclosure is directed to providing an image reading apparatus that is capable of adjusting the position of a reading unit while preventing a foreign substance from entering between the reading unit and a transparent member, and an image forming apparatus including the image reading apparatus.

According to an aspect of the present disclosure, an image reading apparatus includes a document placement unit configured to place a document on the document placement unit, a document conveyance unit configured to convey the document, placed on the document placement unit, along a conveyance path, a reading unit including light receiving elements arranged in a main scanning direction and configured to read an image on the document conveyed by the document conveyance unit, a case accommodating the reading unit in the case and including a transparent member and an opening, wherein the transparent member forms a part of the conveyance path and allows passing of light to the light receiving elements, and the case opening is provided in a side surface at an edge portion in a longitudinal direction of the case, and a movable member including a cover portion and a connection portion and configured to move in an adjustment direction perpendicular to the longitudinal direction of the case, wherein the cover portion covers the case opening while being in contact with an outside of the side surface, and the connection portion connects the reading unit accommodated in the case and the cover portion, wherein, when the movable member moves in the adjustment direction, the reading unit moves within the case to change an angle of the reading unit with respect to a conveyance direction of the document conveyance unit.

Further features of the present disclosure will become apparent from the following description of exemplary embodiments with reference to the attached drawings.

DESCRIPTION OF THE EMBODIMENTS

An image reading apparatus and an image forming apparatus according to an exemplary embodiment of the present disclosure will be described below with reference to the attached drawings. Dimensions, materials, shapes, and relative arrangements of components described in the following exemplary embodiment should not be construed to restrict the scope of the present disclosure unless otherwise specified.

Schematic Configuration of Printer

Figure 1:
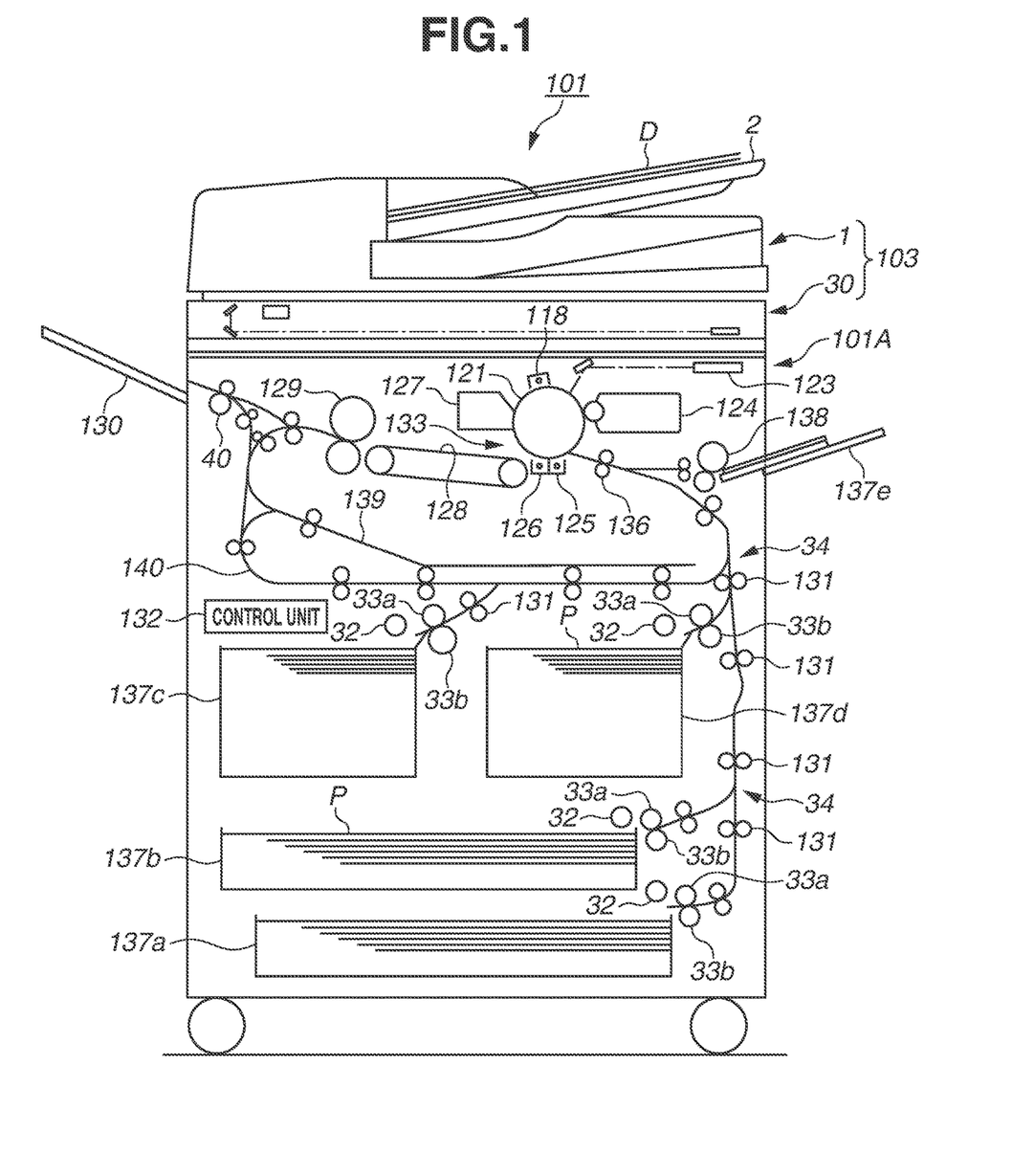
FIG. 1 is a schematic overall cross-sectional view illustrating a printer according to an exemplary embodiment of the present disclosure.

First, a schematic configuration of a printer 101, which is an example of the image forming apparatus according to the present exemplary embodiment, will be described with reference to FIG. 1. FIG. 1 is a cross-sectional view of the printer 101 according to the present exemplary embodiment. In the following description, the side on which a user performs various input/setting operations on an operation unit (not illustrated) of the printer 101 is defined as the "front side" of the printer 101, and the side opposite to the front side is defined as the "back side" of the printer 101. In other words, FIG. 1 illustrates an internal configuration of the printer 101 viewed from the front side.

The printer 101 includes a printer main body 101A and an image reading apparatus 103 as illustrated in FIG. 1. The image reading apparatus 103 disposed above the printer main body 101A includes a scanner 30 and an auto document feeder (ADF) 1, and optically scans a document D to read image information thereon. The image reading apparatus 103 converts the image information into an electrical signal and transfers the electrical signal to a control unit 132 in the printer main body 101A. Accordingly, the printer 101 forms an image on a recording medium based on the image information read by the image reading apparatus 103.

The printer main body 101A includes an image forming unit 133 that forms an image on a paper sheet P serving as a recording medium, and a sheet feeding unit 34 that feeds the paper sheet P to the image forming unit 133. The sheet feeding unit 34 includes sheet storage units 137a, 137b, 137c, and 137d that can store sheets of sizes different from each other. The sheets stored in each of the sheet storage units 137a, 137b, 137c, and 137d are picked up by a corresponding pickup roller 32, separated one by one by a corresponding feed roller 33a and a corresponding retard roller 33b, and passed to a corresponding conveyance roller pair 131. The paper sheet P is then passed sequentially to a plurality of the conveyance roller pairs 131 arranged along a sheet conveyance path and conveyed to a registration roller pair 136.

The paper sheet P placed on a manual feed tray 137e by the user is fed to the inside of the printer main body 101A by a feed roller 138 and conveyed to the registration roller pair 136. The registration roller pair 136 stops the paper sheet P at the leading edge to correct the skew, and resumes the conveyance of the paper sheet P in conjunction with progress of an image forming operation that is a toner image forming process performed by the image forming unit 133.

The image forming unit 133 that forms an image on the paper sheet P is an electrophotographic type unit including a photosensitive drum 121 as a photosensitive member. The photosensitive drum 121 can rotate in the conveyance direction of the paper sheet P, and a charger 118, an exposure device 123, a development device 124, a transfer charger 125, a separation charger 126, and a cleaner 127 are arranged around the photosensitive drum 121. The charger 118 uniformly charges the surface of the photosensitive drum 121. The exposure device 123 exposes the photosensitive drum 121 to light based on the image information input from the image reading apparatus 103 and forms an electrostatic latent image on the photosensitive drum 121.

The development device 124 accommodates two-component developer including toner and carrier, and supplies charged toner to the photosensitive drum 121 to develop the electrostatic latent image and form a toner image on the photosensitive drum 121. The toner image carried by the photosensitive drum 121 is transferred onto the paper sheet P conveyed from the registration roller pair 136 by a bias electric field formed by the transfer charger 125. The paper sheet P to which the toner image has been transferred is separated from the photosensitive drum 121 by a bias electric field formed by the separation charger 126 and conveyed to a fixing unit 129 by a pre-fixing conveyance unit 128. An adhering substance such as transfer residual toner remaining on the photosensitive drum 121 without being transferred to the paper sheet P is removed by the cleaner 127, and the photosensitive drum 121 becomes ready for the next image forming operation.

The paper sheet P conveyed to the fixing unit 129 is pressed and heated while being pinched by a roller pair, so that the toner is melted and fixed and the image is fixed to the paper sheet P. In a case where image output has been completed, the paper sheet P with the fixed image formed thereon is discharged by a discharge roller pair 40 to a discharge tray 130 that protrudes outside the printer main body 101A. In a case where an image is to be formed on the back side of the paper sheet P in duplex printing, the paper sheet P passed through the fixing unit 129 is reversed by a reversing unit 139 and conveyed to the registration roller pair 136 by a duplex conveyance unit 140. Then, the paper sheet P is subjected to image formation again by the image forming unit 133 and discharged to the discharge tray 130.

Configuration of Image Reading Apparatus

Figure 2:
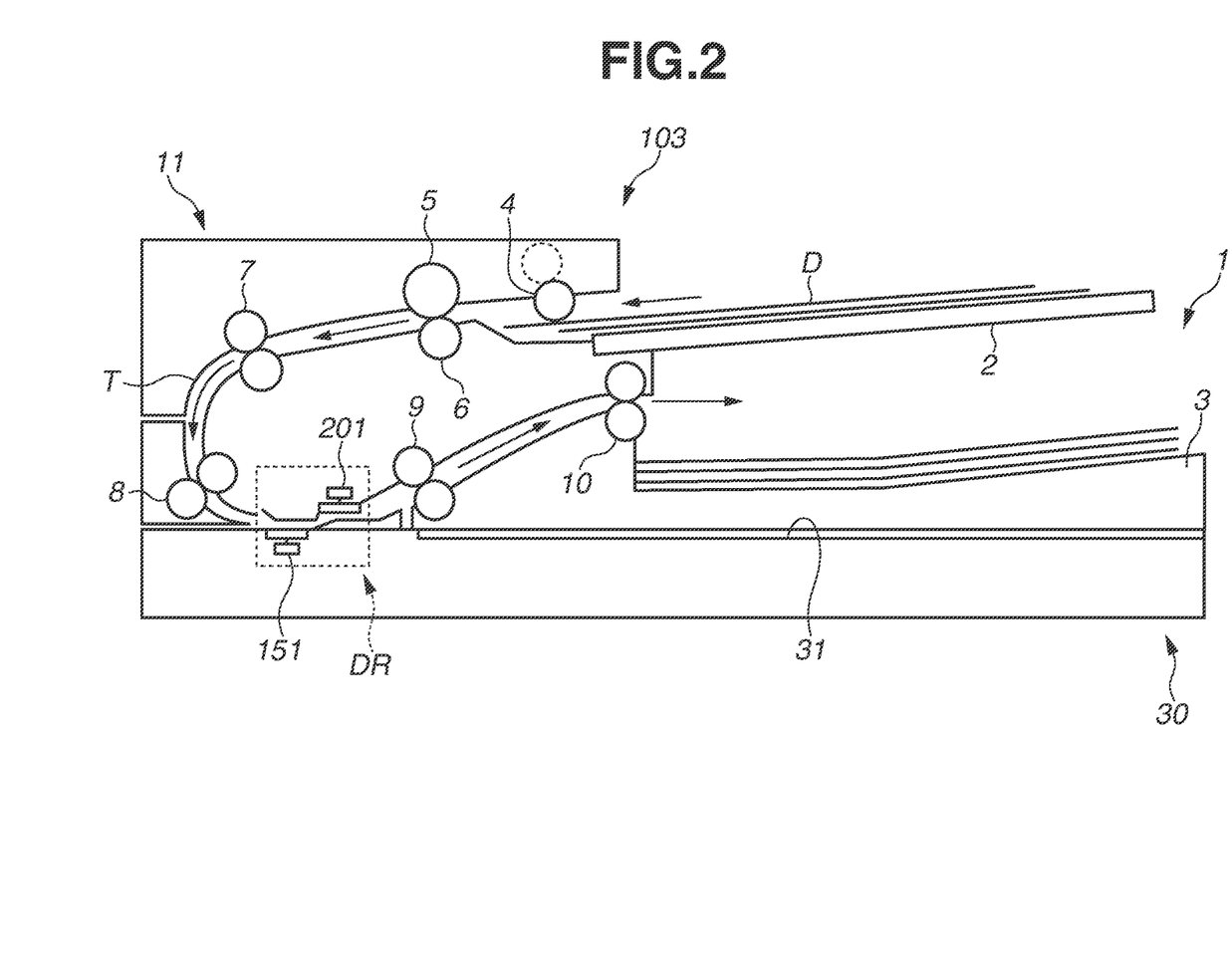
FIG. 2 is a cross-sectional view illustrating an image reading apparatus according to the exemplary embodiment.

Next, a configuration of the image reading apparatus 103 will be described with reference to FIG. 2. FIG. 2 is a cross-sectional view illustrating a schematic configuration of the image reading apparatus 103. As illustrated in FIG. 2, the image reading apparatus 103 includes the scanner 30 and the ADF 1 serving as a document feeding unit. The image reading apparatus 103 also includes a first reading unit 151 disposed in the scanner 30 and a second reading unit 201 disposed in the ADF 1. Each component of the image reading apparatus 103 will be described below.

The first reading unit 151 and the second reading unit 201 are included in a duplex reading section DR that can read both sides of the document D conveyed by the ADF 1. The first reading unit 151 disposed in the scanner 30 reads the image information on the first side of the document D. The second reading unit 201 reads the image information on the second side, which is opposite to the first side, of the document D. The first side and the second side according to the present exemplary embodiment are the bottom side and the top side of the document D in the duplex reading section DR, respectively. In other words, the top side and the bottom side of the document D placed on a document tray 2 are the first side and the second side, respectively. The duplex reading section DR does not always read both sides of the document D and can read only one side thereof.

The first reading unit 151 and the second reading unit 201 each include a contact image sensor (hereinafter referred to as a CIS) that is a scanning device employing an equal-magnification optical system. The first reading unit 151 and the second reading unit 201 each include a light source including a light emitting diode (LED) array arranged in the main scanning direction perpendicular to the conveyance direction of the document D, and a plurality of light receiving elements 211 (for example, see FIG. 8 described below) arranged similarly in the main scanning direction. Light emitted from the LED array and reflected on the document D forms an image on each of the light receiving elements 211 through a lens, and the image is photoelectrically converted by the light receiving element 211.

The scanner 30 is fixed to the top surface of the printer main body 101A (refer to FIG. 1). A flatbed type platen 31 is disposed on the top surface of the scanner 30 as illustrated in FIG. 2. The first reading unit 151 is supported by a carriage (not illustrated) movable in the right-and-left direction (viewed from FIG. 2), and can move from a predetermined position (position illustrated in FIG. 2) in the duplex reading section DR along the entire length of the platen 31.

The ADF 1 is supported by a hinge mechanism (not illustrated) disposed at the back side of the scanner 30 so as to be able to open and close in the vertical direction with respect to the scanner 30. The ADF 1 includes the document tray 2, a document conveyance unit 11, and a document discharge unit 3 in addition to the second reading unit 201. The document tray 2 serving as a document placement unit holds the document D placed by the user. The document conveyance unit 11 includes a document conveyance path T formed on the inside thereof, and feeds the document D placed on the document tray 2 to the duplex reading section DR along the document conveyance path T. An image on the document D fed by the document conveyance unit 11 is read by the duplex reading section DR, and the document D is discharged to the document discharge unit 3.

Next, the document conveyance unit 11 will be described in detail. The document conveyance unit 11 includes a pickup roller 4, a feed roller 5, a retard roller 6, a registration roller pair 7, conveyance roller pairs 8 and 9, and a discharge roller pair 10. The pickup roller 4 can vertically move with respect to the top of the document tray 2, and makes contact with the document D on the document tray 2 to start feeding the document D. The feed roller 5 conveys the document D fed by the pickup roller 4 to the downstream side in the conveyance direction. The retard roller 6 is pressed against the feed roller 5, and a rotation drive force in the direction opposite to the conveyance direction is input to the retard roller 6 via a torque limiter. Accordingly, the feed roller 5 and the retard roller 6 separate the conveyed sheets of the document D one by one.

In a state where the registration roller pair 7 stops rotating, the registration roller pair 7 receives the downstream edge (hereinafter referred to as the leading edge), in the conveyance direction, of the document D conveyed by the feed roller 5, and bends the document D to correct the skew. The registration roller pair 7 then conveys the skew-corrected document D along a curved portion of the document conveyance path T and passes the document D to the conveyance roller pair 8. The conveyance roller pair 8 feeds the document D into the duplex reading section DR and passes the document D to the conveyance roller pair 9 on the downstream side. At this time, the image on the document D is read by the first reading unit 151 and/or the second reading unit 201. The conveyance roller pair 9 passes the document D from the duplex reading section DR to the discharge roller pair 10. The discharge roller pair 10 discharges the document D to the document discharge unit 3.

The image reading apparatus 103 reads the image information on the document D in a feeding-reading mode or a fixed-reading mode. In the feeding-reading mode, the image on document D is scanned while the document D is being fed by the ADF 1. In the fixed-reading mode, the document D placed on the platen 31 is scanned. The feeding-reading mode is selected in a case where the image reading apparatus 103 detects the document D placed on the document tray 2 or in a case where the user explicitly provides an instruction to use the feeding-reading mode via, for example, an operation panel of the printer main body 101A. In the feeding-reading mode, the ADF 1 feeds the sheets of the document D one by one to the duplex reading section DR in a state where the first reading unit 151 is located at the predetermined position in the duplex reading section DR. The duplex reading section DR then reads the image on the sheet of the document D being conveyed in the sub scanning direction. The sub scanning direction is perpendicular to the main scanning direction, and is the direction in which the document D being read is conveyed. In the case of the duplex reading, both the first reading unit 151 and the second reading unit 201 irradiate the document D with scanning light to scan the document D. In the case of simplex reading, only the first reading unit 151 irradiates the document D with the scanning light to scan the document D.

On the other hand, the fixed-reading mode is selected in a case where the image reading apparatus 103 detects the document D placed on the platen 31 or in a case where the user explicitly provides an instruction to use the fixed-reading mode via, for example, the operation panel of the printer main body 101A. In the fixed-reading mode, the first reading unit 151 irradiates the document D placed on the platen 31 with light to scan the document D while moving along the platen 31.

Configuration of Case and Adjustment Member for Reading Unit

Figure 3:
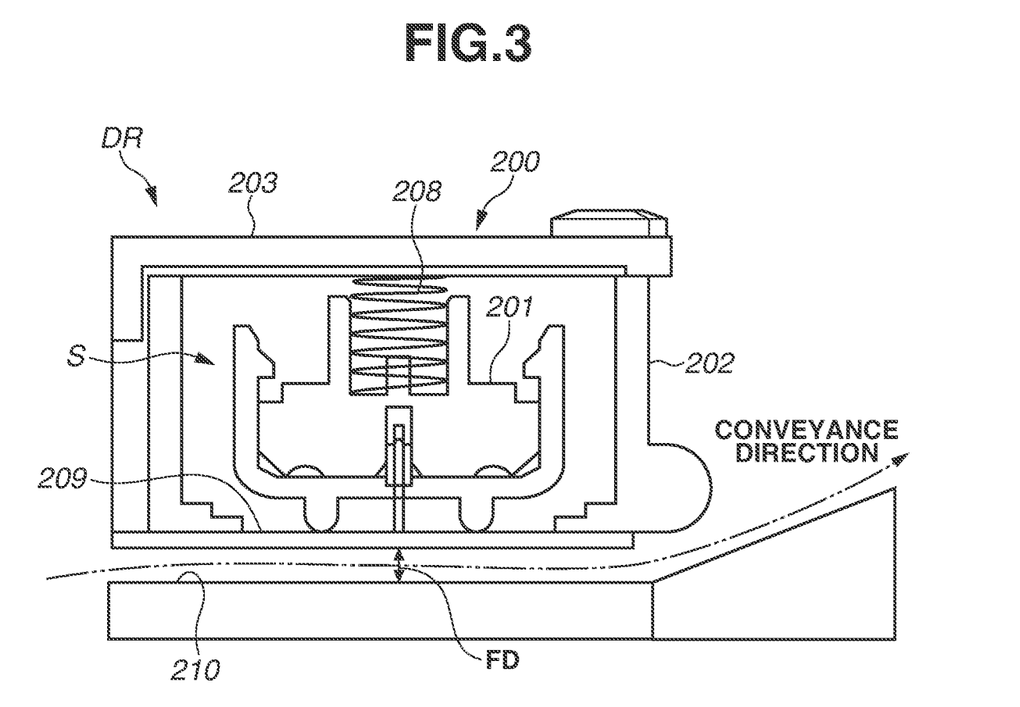
FIG. 3 is a cross-sectional view illustrating a second reading unit and a case.

Next, a configuration of a case 200 for accommodating the second reading unit 201 and a configuration of an adjustment member 204 for adjusting the position of the second reading unit 201 in the case 200 will be described with reference to FIGS. 3 to 7. The adjustment member 204 is an example of a movable member according to the present exemplary embodiment. FIG. 3 is a cross-sectional view of the second reading unit 201 and the case 200 in the duplex reading section DR.

As illustrated in FIG. 3, the duplex reading section DR includes the case 200 and a conveyance guide 210 that forms a part of the document conveyance path T. The case 200 accommodates the second reading unit 201 in an accommodation space S inside the case 200. The case 200 has a box shape extending in the direction perpendicular to the conveyance direction in which the ADF 1 conveys the document D. In other words, the longitudinal direction of the case 200 is perpendicular to the conveyance direction. The case 200 includes a first case member 202, a second case member 203, and a transparent member 209. In other words, the accommodation space S is formed by the first case member 202, the second case member 203, and the transparent member 209. The transparent member 209 is located across the document conveyance path T from the conveyance guide 210, and forms a part of the document conveyance path T. The first case member 202 is fixed to the ADF 1.

A pressing member 208, such as a spring, for pressing the second reading unit 201 toward the transparent member 209 is provided between the second case member 203 and the second reading unit 201. The second reading unit 201 is aligned in the direction of gravity by a pressing force of the pressing member 208, and is configured so that the focal depth range FD of the second reading unit 201 corresponds to the height of the document conveyance path T. Accordingly, the second reading unit 201 ensures that the conveyed document D is in focus, so that image reading accuracy can be improved.

Figure 4:
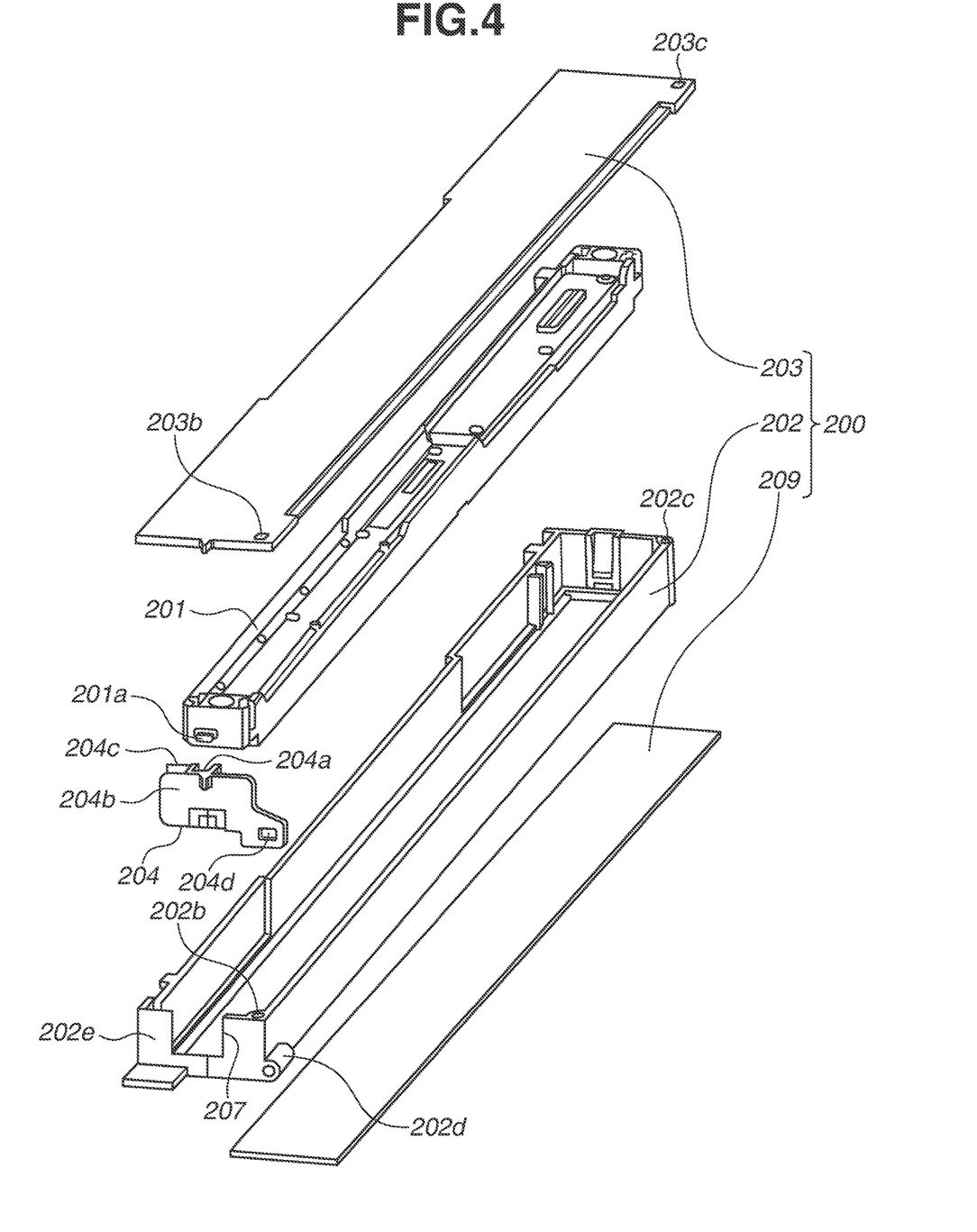
FIG. 4 is an exploded perspective view illustrating the case for accommodating the second reading unit.

FIG. 4 is an exploded perspective view of the case 200. FIG. 4 also illustrates the second reading unit 201 to be accommodated in the case 200, and the adjustment member 204 for adjusting the position of the second reading unit 201. As described above, the case 200 includes the transparent member 209, the first case member 202, and the second case member 203. The first case member 202 has a wall surface perpendicular to the transparent member 209 to enclose the second reading unit 201. The second case member 203 has a wall surface parallel to the transparent member 209 to cover the second reading unit 201 from above.

As illustrated in FIG. 4, the first case member 202 includes an opening 207 in a side surface 202e at an edge portion in the longitudinal direction. The second case member 203 is disposed so as to overlap with the first case member 202 from above. Fixing portions 203b and 203c of the second case member 203 are fixed to fixing portions 202b and 202c of the first case member 202 with screws (not illustrated), so that the second case member 203 is attached to the first case member 202. The transparent member 209 is made of glass or acrylic to allow passing of light to the light receiving elements 211 of the second reading unit 201. The first case member 202 and the second case member 203 are made of a resin material such as polyacetal or acrylonitrile butadiene styrene (ABS). In the present exemplary embodiment, the transparent member 209, the first case member 202, and the second case member 203 form the case 200. Alternatively, the transparent member 209 and the first case member 202 may be integrally formed from a transparent resin material.

The adjustment member 204 adjusts the position of the second reading unit 201 in the accommodation space S. The adjustment member 204 includes a cover portion 204b for covering the entire area of the opening 207 from the outside of the case 200. The second reading unit 201 includes a shaft portion 201a at a first edge portion on the side, in the main scanning direction, on which the adjustment member 204 is located. The adjustment member 204 includes a connection portion 204a for connecting the cover portion 204b and the shaft portion 201a. The shaft portion 201a protrudes in the main scanning direction. The connection portion 204a has a concave shape with which the shaft portion 201a is to be engaged. The adjustment member 204 further includes a projecting portion 204c and a fixing portion 204d in order to fix the position of the adjustment member 204 with respect to the first case member 202.

Figure 5:
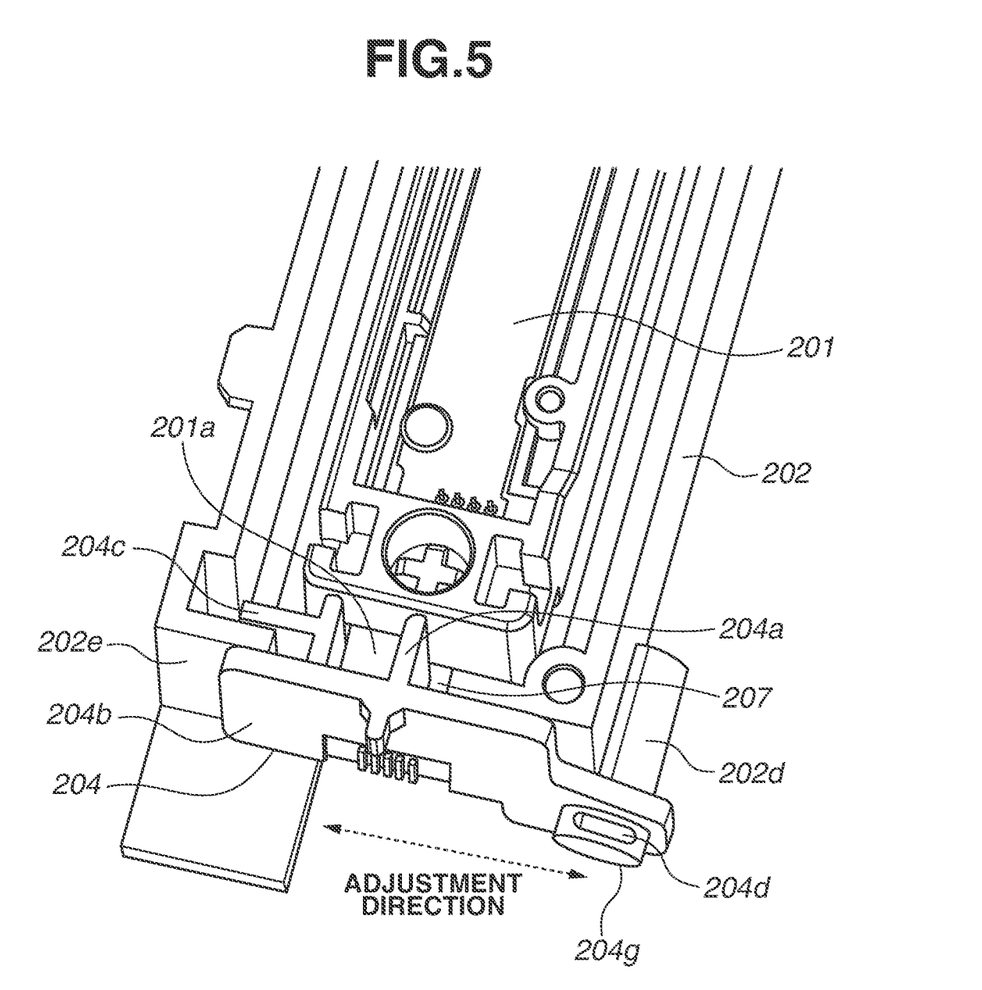
FIG. 5 is a perspective view illustrating an adjustment member for adjusting the position of the second reading unit.

FIG. 5 illustrates the adjustment member 204 at the first edge portion of the second reading unit 201 in a state where the second reading unit 201 is accommodated in the case 200. The second case member 203 is omitted in FIG. 5. The adjustment member 204 is provided on the side surface 202e of the case 200 so as to be movable in the adjustment direction perpendicular to the longitudinal direction of the case 200. As illustrated in FIG. 5, the adjustment member 204 is disposed so that the cover portion 204b covers the entire area of the opening 207 of the case 200 from the outside of the case 200. In this state, the cover portion 204b is in contact with the side surface 202e forming the opening 207 on the outside of the case 200, so that the opening 207 is covered with the cover portion 204b without a gap. Furthermore, the adjustment member 204 sandwiches the side surface 202e of the first case member 202 between the projecting portion 204c and the cover portion 204b. Accordingly, the cover portion 204b and the projecting portion 204c regulate the movement of the adjustment member 204 in the longitudinal direction of the case 200. The connection portion 204a of the adjustment member 204 connects the shaft portion 201a of the second reading unit 201 and the cover portion 204b covering the opening 207 via the opening 207. Accordingly, when the cover portion 204b is moved in the adjustment direction (sub scanning direction), the position of the second reading unit 201 in the accommodation space S can be adjusted. The cover portion 204b has a size capable of covering the entire area of the opening 207 even if the cover portion 204b is moved to any position in the range in which the position of the second reading unit 201 can be adjusted. The fixing portion 204d (first fixing portion) and a fixing portion 202d (second fixing portion) of the first case member 202 are fixed by a screw 204g serving as a fixing member, so that the adjustment member 204 is fixed to the first case member 202.

Figure 6A:
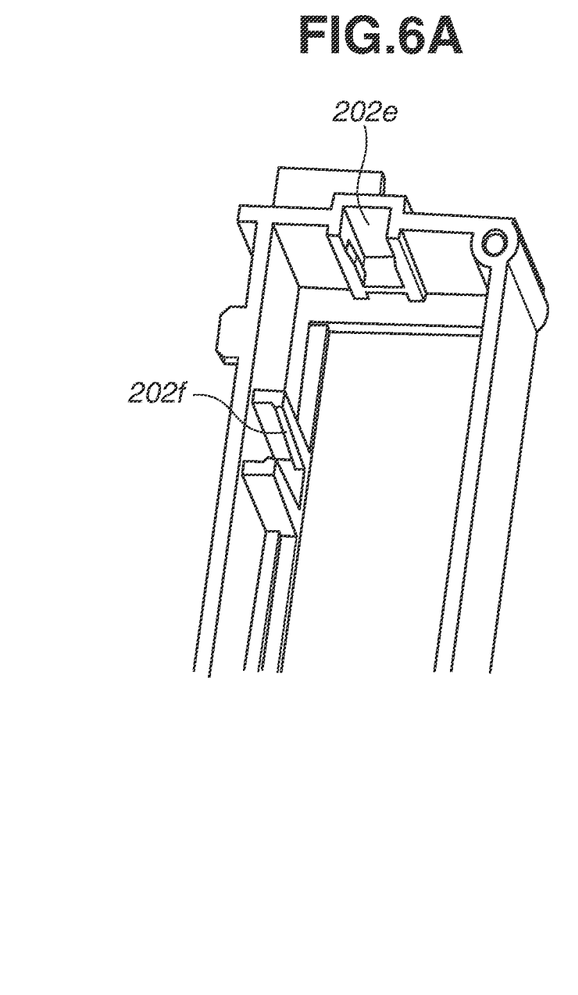
FIG. 6A is a perspective view illustrating groove portions of the case.
Figure 6B:
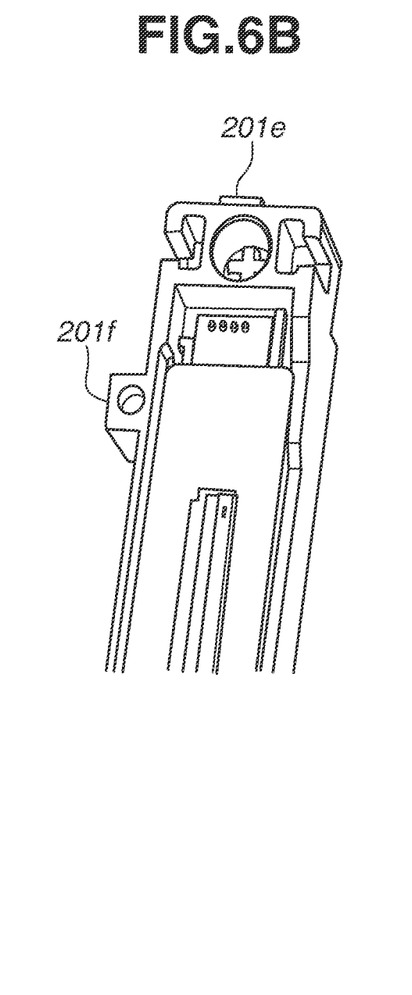
FIG. 6B is a perspective view illustrating a positioning portion of the second reading unit.
Figure 6C:
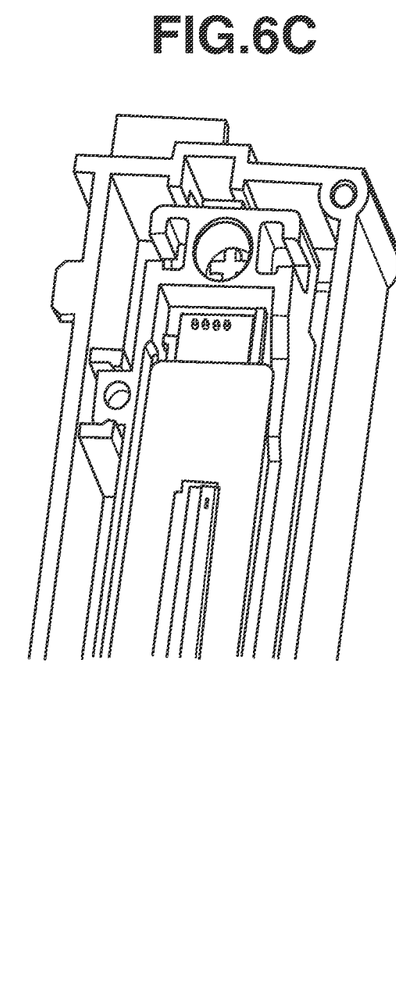
FIG. 6C is a perspective view illustrating a state where the second reading unit is positioned in the case.

FIGS. 6A to 6C are perspective views each illustrating a positioning portion (second edge portion) on the side opposite in the main scanning direction to the side on which the adjustment member 204 illustrated in FIG. 5 is located. As illustrated in FIG. 6A, groove portions 202e and 202f are formed in the first case member 202 and serve as support portions for turnably supporting the second reading unit 201. The groove portion 202e determines the position of the second reading unit 201 in the sub scanning direction. The groove portion 202f serving as a regulation portion regulates the movement of the second reading unit 201 in the main scanning direction. As illustrated in FIG. 6B, the second reading unit 201 includes a shaft portion 201e at the second edge portion on the side opposite in the main scanning direction to the side on which the first edge portion is located. In addition, the second reading unit 201 includes a protruding portion 201f on the side on which the second edge portion is located. As illustrated in FIG. 6C, the shaft portion 201e of the second reading unit 201 is fitted into the groove portion 202e, and the protruding portion 201f of the second reading unit 201 is fitted into the groove portion 202f. Accordingly, the first case member 202 turnably supports the second edge portion of the second reading unit 201. In other words, when the adjustment member 204 is moved in the adjustment direction, the second reading unit 201 is turned about the shaft portion 201e.

Figure 7:
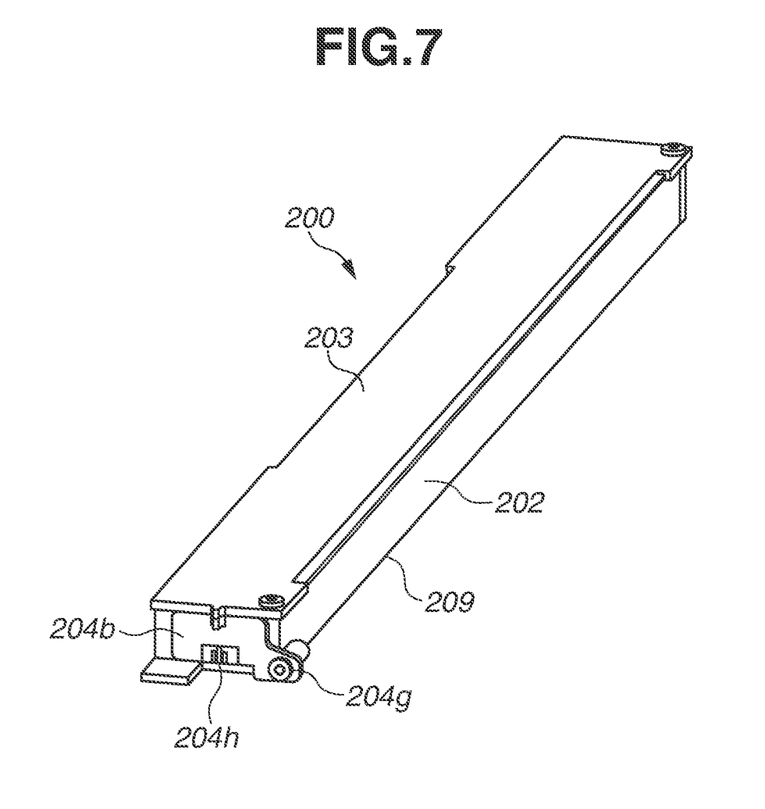
FIG. 7 is a perspective view illustrating a state where the second reading unit is accommodated in the case.

FIG. 7 illustrates a state in which the case 200 and the adjustment member 204 accommodate the second reading unit 201. As illustrated in FIG. 7, in a case where the case 200 and the adjustment member 204 accommodate the second reading unit 201, the opening 207 of the case 200 is covered with the cover portion 204b of the adjustment member 204. Thus, the case 200 and the adjustment member 204 can accommodate the second reading unit 201 without a gap. Accordingly, a foreign substance can be prevented from entering between the second reading unit 201 and the transparent member 209.

Furthermore, as described above, the connection portion 204a of the adjustment member 204 connects the shaft portion 201a of the second reading unit 201 and the cover portion 204b covering the opening 207 via the opening 207. Accordingly, when the adjustment member 204 is moved in the adjustment direction on the outside of the case 200, the second reading unit 201 can be turned inside the case 200. More specifically, the angle of the second reading unit 201 with respect to the conveyance direction can be adjusted in a state where the case 200 and the adjustment member 204 cover the second reading unit 201 without a gap as illustrated in FIG. 7. In addition, an engraved shape 204h provided on the adjustment member 204 allows the user to check the adjustment amount of the second reading unit 201.

Position Adjustment of Reading Unit

Figure 8:
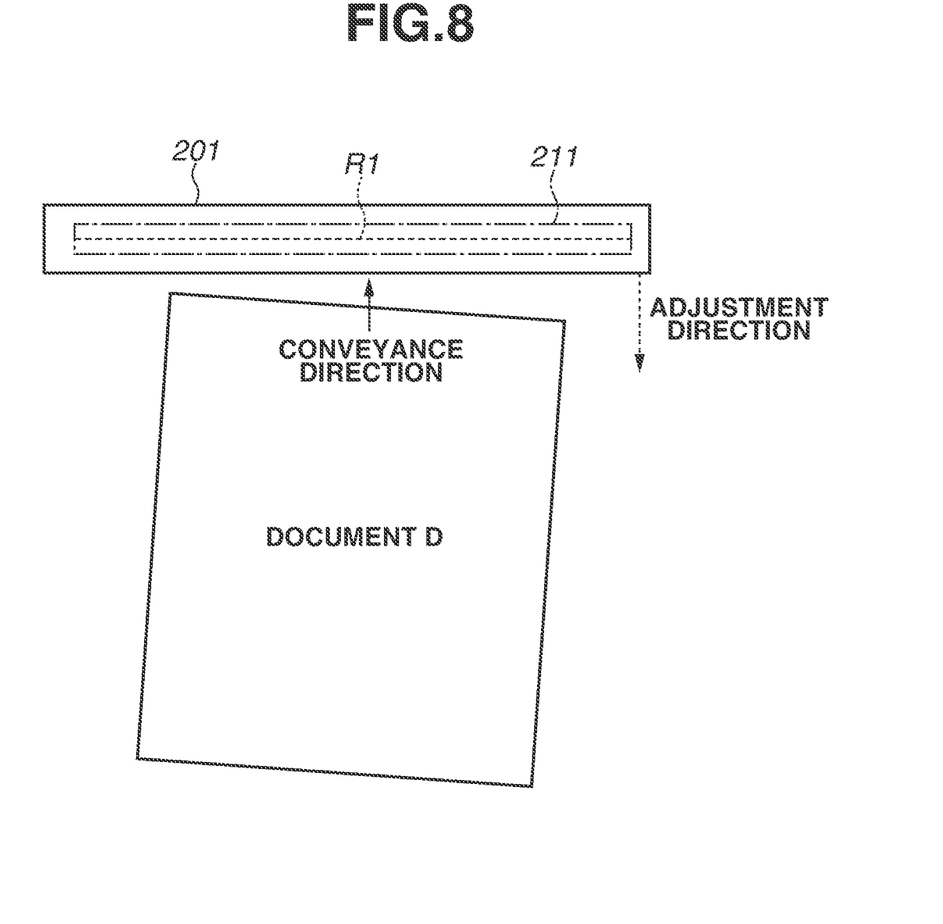
FIG. 8 is a plan view illustrating a state where a skewed document is conveyed to the second reading unit.
Figure 9:
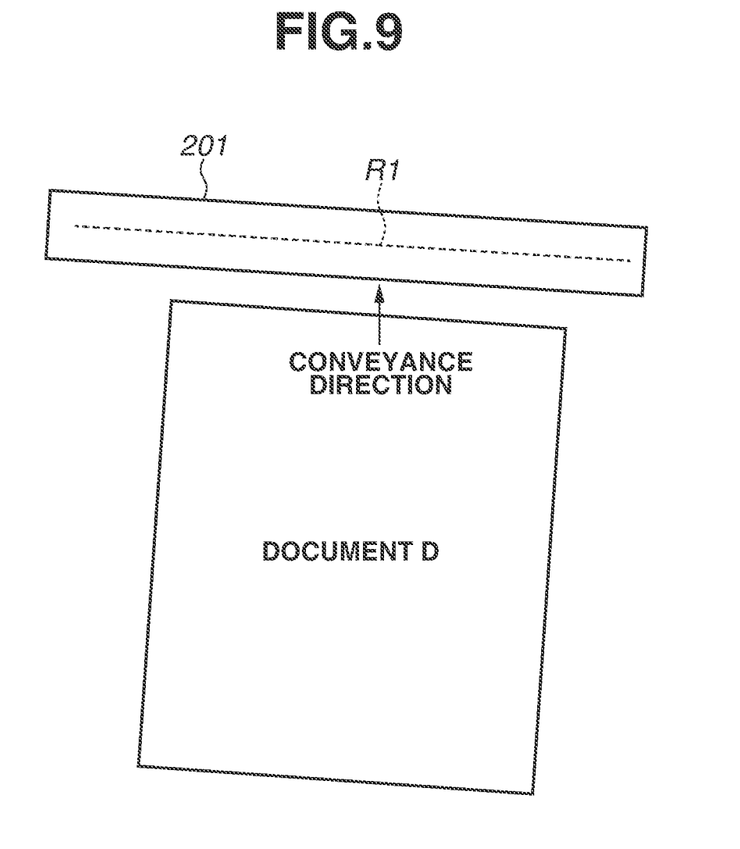
FIG. 9 is a plan view illustrating a state where the position of the second reading unit is adjusted with respect to the document.

Next, positional adjustment of the second reading unit 201 will be described with reference to FIGS. 8 and 9. FIG. 8 is a plan view illustrating a state where the document D is skewed and conveyed to the second reading unit 201. FIG. 9 is a plan view illustrating a state where the position of the second reading unit 201 is adjusted with respect to the document D. As illustrated in FIG. 8, the second reading unit 201 includes the plurality of light receiving elements 211. The plurality of light receiving elements 211 is arranged in the main scanning direction perpendicular to the conveyance direction (sub scanning direction) of the document D, and reads the image information of the document D on a reading line R1 parallel to the main scanning direction. The reading line R1 is a line in which the light receiving elements 211 are arranged in the main scanning direction.

Thus, it is necessary to convey the document D in a state where the leading edge thereof is parallel to the reading line R1. However, as illustrated in FIG. 8, the document D may be skewed while being conveyed to the duplex reading section DR. In general, the skew of the document D is caused by a difference in conveyance force between conveyance roller pairs arranged in the main scanning direction, unevenness on the conveyance guide forming the document conveyance path T, or the like. The skew of the document D does not necessarily occur with only one sheet, and also tends to occur continuously with the subsequent sheets. In such a case, it is necessary to adjust the position of the second reading unit 201 so that the leading edge of the document D to be conveyed and the reading line R1 of the second reading unit 201 are parallel to each other as illustrated in FIG. 9.

As described above, in the present exemplary embodiment, when the cover portion 204b of the adjustment member 204 is moved on the outside of the case 200, the second reading unit 201 can be turned in the accommodation space S inside the case 200. Accordingly, the position of the second reading unit 201 can be adjusted so that the leading edge of the document D to be conveyed and the reading line R1 of the second reading unit 201 are parallel to each other. Furthermore, the cover portion 204b covers the entire area of the opening 207 and thus can prevent a foreign substance from entering into the case 200.

With the conventional configuration illustrated in FIG. 10, the protruding portion 12 cannot largely move in the opening because the elastic member 14 exists in the opening. On the other hand, with the configuration according to the present exemplary embodiment, there is no need to dispose the elastic member in the opening 207 as illustrated in FIG. 5, so that the connection portion 204a can largely move in the opening 207. Accordingly, the position of the second reading unit 201 can be adjusted in a range larger than that of the conventional configuration.

In the present exemplary embodiment, the first reading unit 151 and the second reading unit 201 may include a charge coupled device (CCD) sensor instead of the CIS. Furthermore, the image reading apparatus 103 can be mounted on various types of image forming apparatuses such as a copying machine, a facsimile, a printer, and a multifunction peripheral and can also be used alone.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-095015, filed May 29, 2020, which is hereby incorporated by reference herein in its entirety.

What is claimed is:
1. An image reading apparatus comprising:
a document placement unit configured to place a document on the document placement unit;
a document conveyance unit configured to convey the document, placed on the document placement unit, along a conveyance path;
a reading unit including light receiving elements arranged in a main scanning direction and configured to read an image on the document conveyed by the document conveyance unit;
a case accommodating the reading unit in the case and including a transparent member and an opening, wherein the transparent member forms a part of the conveyance path and allows passing of light to the light receiving elements, and the case opening is provided in a side surface at an edge portion in a longitudinal direction of the case; and
a movable member including a cover portion and a connection portion and configured to move in an adjustment direction perpendicular to the longitudinal direction of the case, wherein the cover portion covers the case opening while being in contact with an outside of the side surface, and the connection portion connects the reading unit accommodated in the case and the cover portion,
wherein, when the movable member moves in the adjustment direction, the reading unit moves within the case to change an angle of the reading unit with respect to a conveyance direction of the document conveyance unit.

2. The image reading apparatus according to claim 1, wherein the reading unit further includes a protruding portion protruding in the main scanning direction, and wherein the connection portion has a concave shape with which the protruding portion is engaged.

3. The image reading apparatus according to claim 1, wherein a first edge portion of the reading unit in the main scanning direction is connected to the cover portion by the connection portion,
wherein the case further includes a support portion configured to turnably support a second edge portion of the reading unit, wherein the second edge portion is located on a side opposite in the main scanning direction to a side on which the first edge portion is located, and
wherein, when the movable member moves in the adjustment direction, the reading unit turns in the case.

4. The image reading apparatus according to claim 1, wherein the case further includes a regulation portion configured to regulate a movement of the reading unit in the main scanning direction.

5. The image reading apparatus according to claim 1, wherein the movable member further includes a projecting portion and sandwiches the side surface between the projecting portion and the cover portion, and
wherein the cover portion and the projecting portion regulate a movement of the movable member in the longitudinal direction of the case.

6. The image reading apparatus according to claim 1, further comprising a pressing member provided inside the case and pressing the reading unit toward the transparent member.

7. The image reading apparatus according to claim 1, wherein the case further includes a first case member having a wall surface perpendicular to the transparent member and enclosing the reading unit, and a second case member having a wall surface parallel to the transparent member and covering the reading unit from above.

8. The image reading apparatus according to claim 1, further comprising a fixing member fixing a position of the movable member with respect to the case, wherein, to fix the position of the movable member with respect to the case, the fixing member fixes a first fixing portion provided in the movable member and a second fixing portion provided in the case to each other.

9. The image reading apparatus according to claim 1, further comprising a scanner configured to read an image on a first side of the document,
wherein the first side of the document is a top side of the document placed on the document placement unit, and
wherein the reading unit reads an image on a second side of the document, wherein the second side is opposite to the first side.

10. An image forming apparatus comprising:
a document placement unit configured to place a document on the document placement unit;
a document conveyance unit configured to convey the document, placed on the document placement unit, along a conveyance path;
a reading unit including light receiving elements arranged in a main scanning direction and configured to read an image on the document conveyed by the document conveyance unit;
an image forming unit configured to form an image on a sheet based on information about the image on the document read by the reading unit;
a case accommodating the reading unit in the case and including a transparent member and an opening, wherein the transparent member forms a part of the conveyance path and allows passing of light to the light receiving elements, and the case opening is provided in a side surface at an edge portion in a longitudinal direction of the case; and
a movable member including a cover portion and a connection portion and configured to move in an adjustment direction perpendicular to the longitudinal direction of the case, wherein the cover portion covers the case opening while being in contact with an outside of the side surface, and the connection portion connects the reading unit accommodated in the case and the cover portion,
wherein, when the movable member moves in the adjustment direction, the reading unit moves within the case to change an angle of the reading unit with respect to a conveyance direction of the document conveyance unit.

11. The image forming apparatus according to claim 10,
wherein the reading unit further includes a protruding portion protruding in the main scanning direction, and
wherein the connection portion has a concave shape with which the protruding portion is engaged.

12. The image forming apparatus according to claim 10,
wherein a first edge portion of the reading unit in the main scanning direction is connected to the cover portion by the connection portion,
wherein the case further includes a support portion configured to turnably support a second edge portion of the reading unit, wherein the second edge portion is located on a side opposite in the main scanning direction to a side on which the first edge portion is located, and
wherein, when the movable member moves in the adjustment direction, the reading unit turns in the case.

13. The image forming apparatus according to claim 10, wherein the case further includes a regulation portion configured to regulate a movement of the reading unit in the main scanning direction.

14. The image forming apparatus according to claim 10,
wherein the movable member further includes a projecting portion and sandwiches the side surface between the projecting portion and the cover portion, and
wherein the cover portion and the projecting portion regulate a movement of the movable member in the longitudinal direction of the case.

15. The image forming apparatus according to claim 10, further comprising a pressing member provided inside the case and pressing the reading unit toward the transparent member.

16. The image forming apparatus according to claim 10, wherein the case further includes a first case member having a wall surface perpendicular to the transparent member and enclosing the reading unit, and a second case member having a wall surface parallel to the transparent member and covering the reading unit from above.

17. The image forming apparatus according to claim 10, further comprising a fixing member fixing a position of the movable member with respect to the case,
wherein, to fix the position of the movable member with respect to the case, the fixing member fixes a first fixing portion provided in the movable member and a second fixing portion provided in the case to each other.

18. The image forming apparatus according to claim 10, further comprising a scanner configured to read an image on a first side of the document,
wherein the first side of the document is a top side of the document placed on the document placement unit, and
wherein the reading unit reads an image on a second side of the document, wherein the second side is opposite to the first side.

* * * * *